(12) United States Patent
Akutsu

(10) Patent No.: US 11,326,986 B2
(45) Date of Patent: May 10, 2022

(54) VEHICLE EXCITATION DEVICE HAVING WHEEL SUPPORTING PART

(71) Applicant: Honda Motor Co., Ltd., Tokyo (JP)

(72) Inventor: Susumu Akutsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/944,170

(22) Filed: Jul. 31, 2020

(65) Prior Publication Data
US 2021/0033495 A1 Feb. 4, 2021

(30) Foreign Application Priority Data
Jul. 31, 2019 (JP) .............................. JP2019-140634

(51) Int. Cl.
*G01M 17/007* (2006.01)
*G01M 17/04* (2006.01)

(52) U.S. Cl.
CPC ...... *G01M 17/045* (2013.01); *G01M 17/0078* (2013.01)

(58) Field of Classification Search
CPC ......... G01M 17/0072; G01M 17/0074; G01M 17/0078; G01M 17/045; G01M 17/065
USPC .................................................... 73/669, 670
See application file for complete search history.

(56) References Cited

U.S. PATENT DOCUMENTS

| 3,555,893 | A | * | 1/1971 | Holzman | ............... | G01M 17/06 |
| | | | | | | 73/669 |
| 3,690,145 | A | * | 9/1972 | Brisard | ................. | G01M 17/04 |
| | | | | | | 73/11.08 |
| 4,733,558 | A | * | 3/1988 | Grenier | ............... | G01M 13/027 |
| | | | | | | 73/115.07 |
| 4,981,034 | A | * | 1/1991 | Haeg | .................... | G01M 13/027 |
| | | | | | | 73/115.07 |
| 7,058,488 | B2 | * | 6/2006 | Kemp | ................. | G01M 17/007 |
| | | | | | | 701/29.1 |
| 7,146,859 | B2 | * | 12/2006 | Dittmann | ............ | G01M 17/007 |
| | | | | | | 73/669 |

(Continued)

FOREIGN PATENT DOCUMENTS

| JP | 2005233909 | 9/2005 |
| JP | 2006329879 | 12/2006 |

(Continued)

OTHER PUBLICATIONS

Office Action of Japan Counterpart Application, with English translation thereof, dated Mar. 23, 2021, pp. 1-6, 2019-140634.

*Primary Examiner* — Eric S. McCall
(74) *Attorney, Agent, or Firm* — JCIPRNET

(57) ABSTRACT

The disclosure provides an excitation device capable of suppressing resonance during excitation and reducing the size in a vertical direction. An excitation device (1) includes front and rear mounting plates (5 and 6) having openings (5g and 6g); a base plate (8) arranged below the mounting plates (5 and 6), slope parts (3) to which the mounting plates (5 and 6) and the base plate (8) are fixed; a first roller (17) and a second roller (16) located below the openings (5g and 6g); a hydraulic actuator (12) having a hydraulic cylinder (12a) that excites the second roller (16) in a front-rear direction of a wheel (W); and a bracket (12c) having a lower end fixed to the base plate (8) and an upper end fixed to the mounting plates (5 and 6), and supporting the hydraulic cylinder (12a).

4 Claims, 12 Drawing Sheets

(56) References Cited

U.S. PATENT DOCUMENTS

| | | | | |
|---|---|---|---|---|
| 7,181,971 | B1* | 2/2007 | Sauer | G01M 7/04 |
| | | | | 73/670 |
| 7,543,487 | B2* | 6/2009 | Matsumoto | G01M 17/0072 |
| | | | | 73/116.07 |
| 2004/0134080 | A1* | 7/2004 | Hara | G01L 5/20 |
| | | | | 33/203.13 |
| 2005/0188753 | A1* | 9/2005 | Kurai | G01L 5/20 |
| | | | | 73/146 |
| 2008/0087104 | A1* | 4/2008 | Matsumoto | G01M 17/0072 |
| | | | | 73/862.55 |
| 2008/0216621 | A1* | 9/2008 | Nijssen | B23B 5/32 |
| | | | | 82/105 |
| 2009/0133484 | A1* | 5/2009 | Inoue | G01M 17/0074 |
| | | | | 73/117.01 |
| 2010/0058851 | A1* | 3/2010 | Lawrence | G01L 5/282 |
| | | | | 73/123 |
| 2012/0118054 | A1* | 5/2012 | Bonacini | B60T 3/00 |
| | | | | 73/116.01 |
| 2018/0197356 | A1 | 7/2018 | Cho et al. | |
| 2019/0331556 | A1* | 10/2019 | Knestel | G01M 17/04 |
| 2021/0033493 | A1* | 2/2021 | Akutsu | F16G 1/28 |
| 2021/0033496 | A1* | 2/2021 | Akutsu | G01M 17/0078 |
| 2021/0215574 | A1* | 7/2021 | Akutsu | G01M 7/02 |
| 2021/0239573 | A1* | 8/2021 | Inagawa | G01M 17/0078 |

FOREIGN PATENT DOCUMENTS

| | | |
|---|---|---|
| JP | 2007147394 | 6/2007 |
| JP | 2017009545 | 1/2017 |

* cited by examiner

VEHICLE EXCITATION DEVICE HAVING WHEEL SUPPORTING PART

CROSS-REFERENCE TO RELATED APPLICATION

This application claims the priority benefits of Japanese application no. 2019-140634, filed on Jul. 31, 2019. The entirety of the above-mentioned patent application is hereby incorporated by reference herein and made a part of this specification.

BACKGROUND

Technical Field

The disclosure relates to an excitation device that excites each wheel of a vehicle to be excited.

Description of Related Art

A device described in Patent Document 1 is known as an excitation device. The excitation device is applied to a vehicle inspection device that performs a durability test for a four-wheel vehicle, and the excitation device includes a total of four exciters for left and right front wheels and left and right rear wheels. Each of the four exciters is provided for exciting the corresponding wheel, and includes a vertical actuator that generates vibration in a vertical direction, a mounting table that is excited by the vertical actuator, a front-rear actuator that is built in the mounting table and generates vibration in a front-rear direction, and a vibration plate driven by the front-rear actuator.

In the vehicle inspection device, when the wheels are mounted on the mounting tables, the vibration plate of the front wheel exciter comes into contact with the front wheel from the front obliquely in an inclined position, and the vibration plate of the rear wheel exciter comes into contact with the rear wheel from the rear obliquely in an inclined position. Then, each wheel is excited in the vertical direction by the vertical actuator and excited in the front-rear direction and the vertical direction by the front-rear actuator.

RELATED ART

Patent Document

[Patent Document 1] Japanese Laid-Open No. 2007-147394

Since the excitation device of Patent Document 1 described above requires the vertical actuator that extends in the vertical direction and the mounting table that incorporates the front-rear actuator, the size of the excitation device, particularly the size in the vertical direction, increases and the resonance frequency in the front-rear direction decreases. In order to avoid this, it is conceivable to omit the vertical actuator and increase the size of the front-rear actuator so as to excite the wheels in the front-rear direction and the vertical direction. However, when such a configuration is adopted, an excitation member of the front-rear actuator is structured to receive a bending load. Therefore, during the operation of the front-rear actuator, resonance may occur around the excitation member and cause a force to peel the front-rear actuator from the mounting table. As a result, the front-rear actuator may rattle with respect to the mounting table, or the front-rear actuator may malfunction.

In view of the above, the disclosure provides an excitation device capable of suppressing resonance during excitation and reducing the size in the vertical direction.

SUMMARY

According to an embodiment of the disclosure, an excitation device 1 excites each of a plurality of wheels W of a vehicle V to be excited. The excitation device 1 includes: a mounting plate (front and rear mounting plates 5 and 6) mounting each of the wheels W; a bottom plate (base plate 8, movable base plate 11) arranged below the mounting plate to keep an interval between the mounting plate and the bottom plate in a vertical direction; a first fixing part (slope part 3, bearing part 15) extending between the mounting plate and the bottom plate, and fixed to the bottom plate and fixed to the mounting plate in a state of supporting the mounting plate; a wheel supporting part (first roller 17, second roller 16) supporting a lower side of each of the wheels; an actuator (hydraulic actuator 12) including an excitation part (hydraulic cylinder 12a) connected to the wheel supporting part and exciting the wheel supporting part in a front-rear direction of each of the wheels W; and a supporting part (bracket 12c) having a lower end fixed to the bottom plate and an upper end fixed to the mounting plate, and supporting the excitation part (hydraulic cylinder 12a) of the actuator.

DESCRIPTION OF THE EMBODIMENTS

Figure 1:
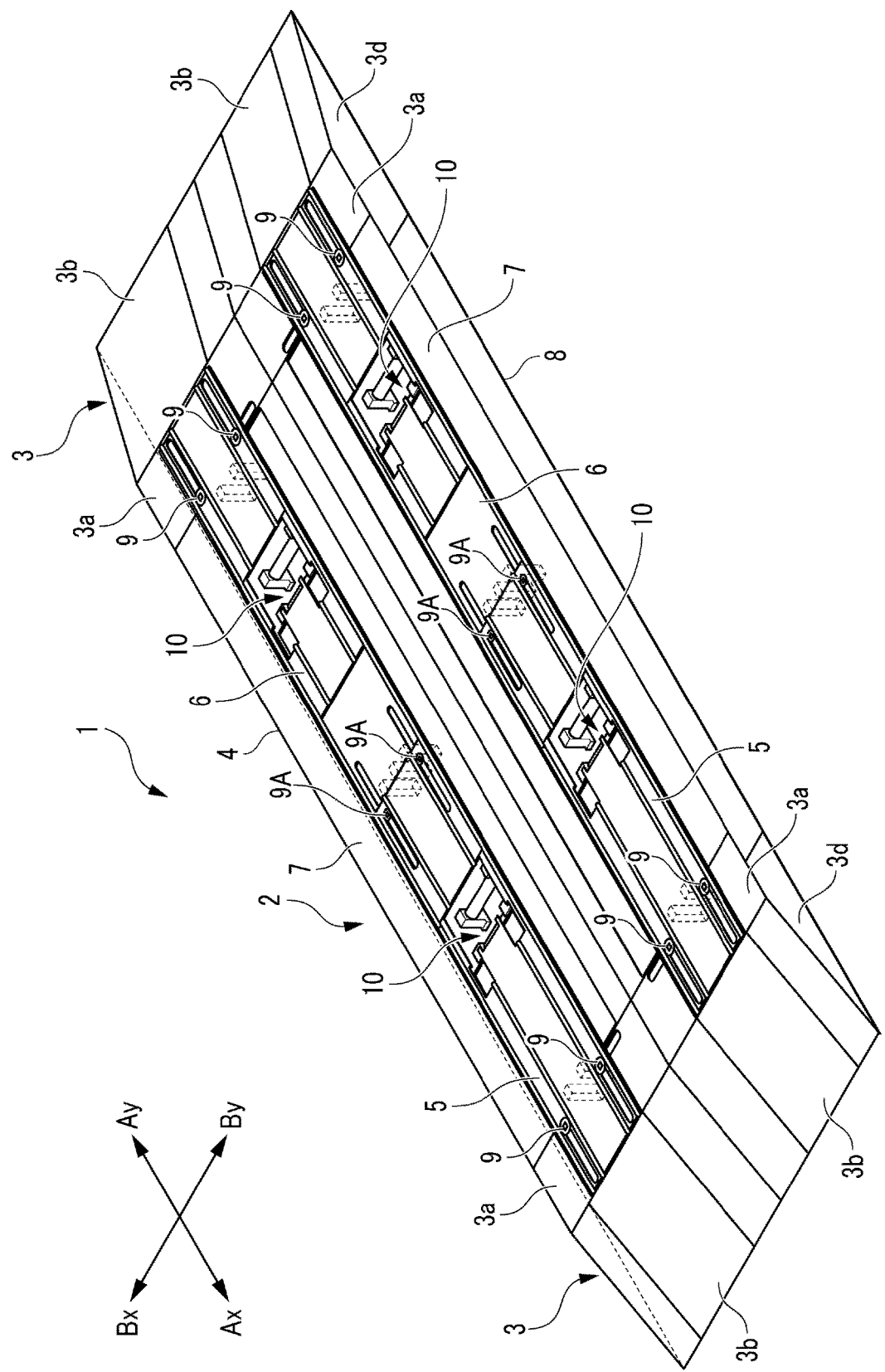
FIG. 1 is a perspective view showing an appearance of an excitation device according to an embodiment of the disclosure.

According to the excitation device, the wheel supporting part supporting the lower side of each wheel is excited in the front-rear direction of each wheel by the excitation part of the actuator. Further, the excitation part of the actuator is supported by the supporting part, and the lower end of the supporting part is fixed to the bottom plate and the upper end is fixed to the mounting plate. Furthermore, the first fixing part is fixed to the bottom plate, and is fixed to the mounting plate in a state of supporting the mounting plate. Thus, during the operation of the actuator, the bending load acting on the supporting part can be firmly supported by both the bottom plate and the mounting plate. As a result, the rigidity of the periphery of the excitation part during excitation can be increased and the natural frequency, i.e., the resonance frequency, can be increased, by which the resonance of the bottom plate, etc. at the periphery of the excitation part can be suppressed.

In the excitation device 1 according to an embodiment of the disclosure, the mounting plate includes an opening 5g, 6g that has a size larger than a size of a tread of each of the wheels W in the front-rear direction and a left-right direction. The wheel supporting part is provided on the bottom plate and is located below the opening 5g, 6g of the mounting plate, and includes a pair of holding parts (first roller 17, second roller 16) holding the lower side of each of the wheels W from the front-rear direction of the each of the wheels W, and the actuator (hydraulic actuator 12) excites one (second roller 16) of the pair of holding parts.

According to the excitation device, in a state where the lower side of each wheel is held by the pair of holding parts from the front-rear direction of each wheel, each wheel is excited by the excitation part of the actuator in the front-rear direction of each wheel. Accordingly, one of the pair of holding parts is excited in the front-rear direction of each wheel so that the vibration is input in an oblique direction to the contact point between each wheel and one holding part. Thus, the vibrations of the force components act on each wheel in the front-rear direction and the vertical direction, and therefore each wheel can be excited in the front-rear direction and the vertical direction with one actuator. As a result, the size in the vertical direction can be reduced as compared with the excitation device of Patent Document 1 which requires two actuators (note that the "connection" of " . . . connected to one of the pair of holding parts" in the specification includes not only direct connection to one of the pair of holding parts but also connection via another member).

In the excitation device 1 according to an embodiment of the disclosure, the bottom plate includes: a base plate 8 which is fixed to an immovable second fixing part (floor F) in a state of being mounted on the second fixing part, and to which the first fixing part is fixed; and a movable base plate 11 detachably fixed onto the base plate 8. The pair of holding parts and the lower end of the supporting part are fixed to the movable base plate 11, and the mounting plate (front and rear mounting plates 5 and 6) is detachably fixed to the first fixing part (slope part 3).

According to the excitation device, the base plate is fixed to the immovable second fixing part in a state of being mounted on the second fixing part, and the movable base plate is detachably fixed onto the base plate. Further, the pair of holding parts and the lower end of the supporting part are fixed to the movable base plate, and the mounting plate is detachably fixed to the first fixing part. Therefore, when the fixing of the movable base plate and the base plate is released, and the fixing of the mounting plate and the first fixing part is released, the mounting plate and the movable base plate can be moved while the upper end and the lower end of the supporting part remain fixed to the mounting plate and the movable base plate, respectively.

Then, after the movement, when the movable base plate is fixed to the base plate as the mounting plate is fixed to the first fixing part, as described above, the bending load acting on the excitation part during the operation of the actuator can be firmly supported by both the movable base plate and the mounting plate. That is, when the positions of the mounting plate and the movable base plate are moved, high rigidity of the periphery of the excitation part during excitation can be ensured even after the movement, and resonance during excitation can be suppressed.

The excitation device 1 according to an embodiment of the disclosure further includes: an excitation member (excitation shaft 14) having one end connected to one holding part (second roller 16) and an other end connected to the excitation part (hydraulic cylinder 12a) of the actuator, and excited in the front-rear direction of each of the wheels W by the actuator; and a bearing part 15 having a lower end fixed to the bottom plate and an upper end fixed to the mounting plate, and supporting the excitation member.

According to the excitation device, during the operation of the actuator, the excitation member that is excited in the front-rear direction is supported by the bearing part, and the bearing part has a lower end fixed to the base plate and an upper end fixed to the mounting plate. As described above, since the excitation member is firmly supported by the bearing part from the vertical direction, the bending load acting on the excitation member can be effectively supported by the bearing part during the operation of the actuator, and resonance at the periphery of the bearing part can be suppressed.

In the excitation device 1 according to an embodiment of the disclosure, the bottom plate includes: a base plate 8 which is fixed to an immovable second fixing part (floor F) in a state of being mounted on the second fixing part, and to which the first fixing part is fixed; and a movable base plate 11 detachably fixed onto the base plate 8. The pair of holding parts, the lower end of the supporting part, and the bearing part 15 are fixed to the movable base plate 11, and the mounting plate (front and rear mounting plates 5 and 6) is detachably fixed to the first fixing part (slope part 3).

According to the excitation device, the movable base plate is detachably fixed onto the base plate. The pair of holding parts, the lower end of the supporting part, and the bearing part are fixed to the movable base plate. In addition, the mounting plate is detachably fixed to the first fixing part. Therefore, when the fixing of the movable base plate and the base plate is released, and the fixing of the mounting plate and the first fixing part is released, the mounting plate and the movable base plate can be moved while the supporting part and the upper end and the lower end of the bearing part remain fixed to the mounting plate and the movable base plate, respectively.

Then, after the movement, when the movable base plate is fixed to the base plate as the mounting plate is fixed to the first fixing part, as described above, the bending load acting on the excitation part of the actuator and the excitation member during the operation of the actuator can be firmly supported by both the movable base plate and the mounting plate. As a result, when the positions of the mounting plate and the movable base plate are moved, high rigidity of the periphery of the excitation part during excitation can be ensured even after the movement, and resonance during excitation can be suppressed.

Hereinafter, an excitation device according to an embodiment of the disclosure will be described with reference to the drawings. The excitation device 1 shown in FIG. 1 of the present embodiment is applied to a vehicle inspection device for inspecting a vehicle V (see FIG. 11), and the excitation device 1 is provided with four exciters 10.

In the excitation device 1, as described later, four wheels W (see FIG. 11) of the vehicle V to be inspected are excited by the four exciters 10 respectively, thereby inspecting the vehicle V for abnormal noise or the like. In the following description, for convenience, the Ax side of the arrow Ax-Ay in FIG. 1 is called "front", the Ay side is called "rear", the Bx side of the arrow Bx-By is called "left", the By side is called "right", the upper side is called "top", and the lower side is called "bottom".

Figure 2:
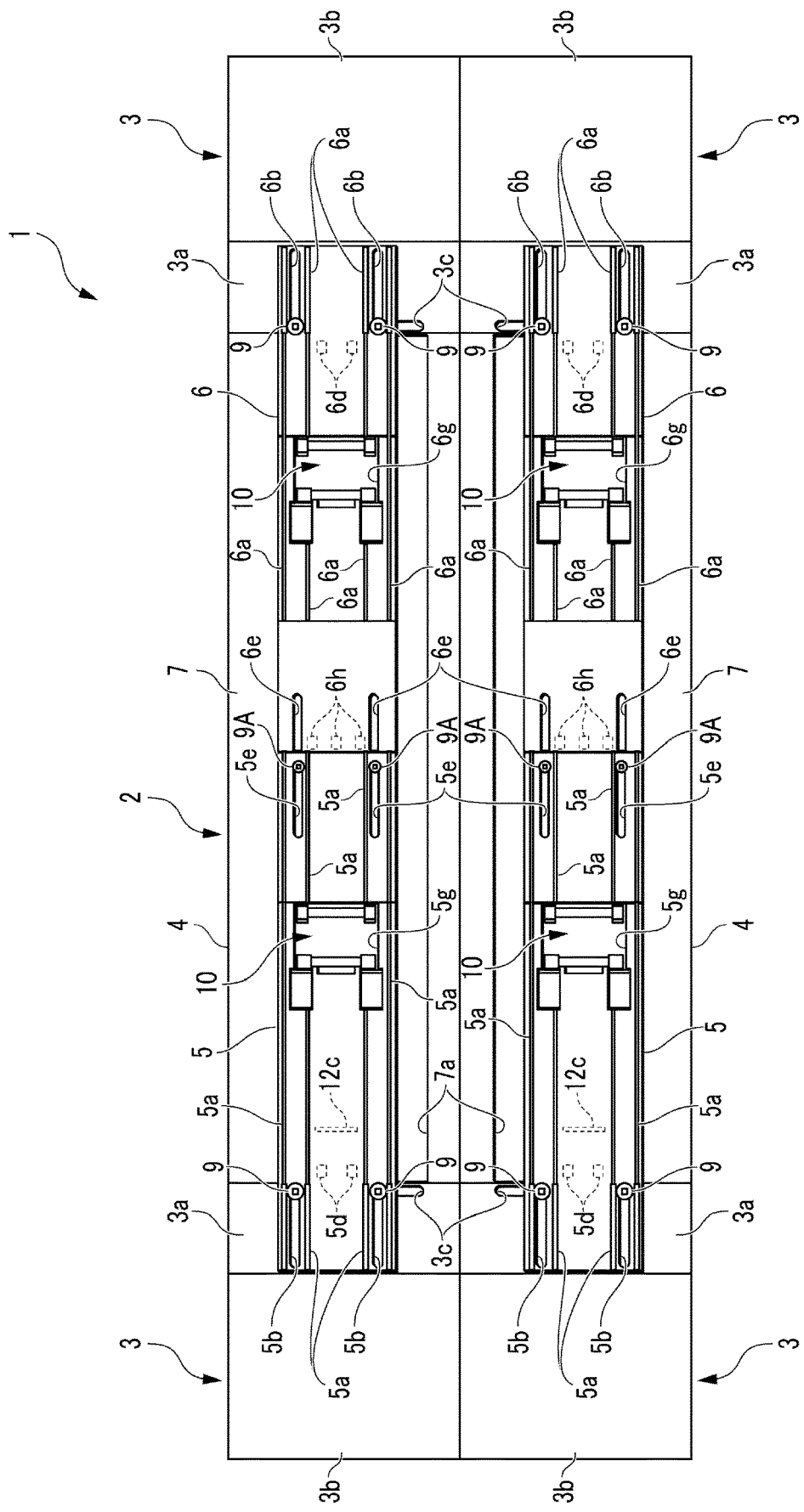
FIG. 2 is a plan view showing a state where a tread corresponding interval and a wheelbase corresponding interval between four exciters are set to maximum values.
Figure 3:
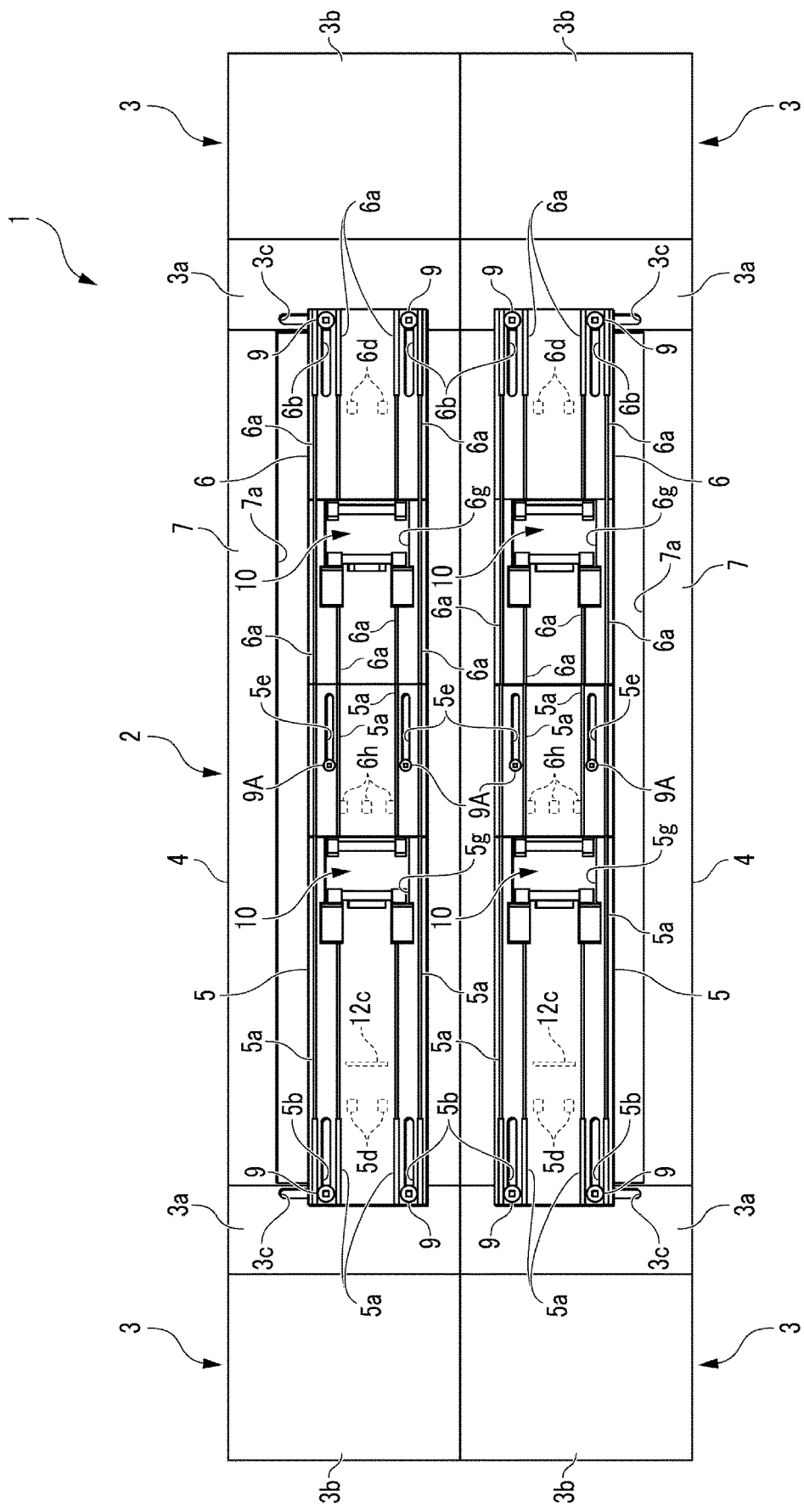
FIG. 3 is a plan view showing a state where the tread corresponding interval and a wheelbase corresponding interval between the four exciters are set to minimum values.

The excitation device 1 includes a mounting table 2 for mounting the vehicle V at the time of inspection, and the mounting table 2 is installed on a floor surface (not shown). Since the left half and the right half of the mounting table 2 are configured to be plane-symmetric, as shown in FIG. 1 to FIG. 3, the left half is described as an example hereinafter.

The left half of the mounting table 2 includes a mounting part 4 that has a rectangular shape in the plan view and extends in a front-rear direction, and front and rear slope parts 3 provided before and after the mounting part 4. In the present embodiment, the front and rear slope parts 3 correspond to a first fixing part. The front slope part 3 defines a flat part 3a and an inclined surface 3b. A surface of the flat part 3a is continuous with the front end of the mounting part 4. The inclined surface 3b is continuous with the flat part 3a and extends obliquely downward to the front.

A long hole 3c is formed in the flat part 3a. The long hole 3c has a predetermined width in the front-rear direction and extends at a predetermined length in a left-right direction with a predetermined interval between the long hole 3c and an edge of an opening 7a (will be described later) of a top plate 7, and two ends of the long hole 3c are formed in a semicircular shape in the plan view.

A plurality of supports (not shown) are provided inside the front slope part 3. The upper ends of these supports are fixed to the flat part 3a and the inclined surface 3b, and the lower ends thereof are fixed to the bottom surface part 3d of the slope part 3. Thus, a force acting on the front slope part 3 from above is supported by these supports.

In addition, the rear slope part 3 defines a flat part 3a and an inclined surface 3b. A surface of the flat part 3a is continuous with the rear end of the mounting part 4. The inclined surface 3b is continuous with the flat part 3a and extends obliquely downward to the rear. A long hole 3c is also formed in the flat part 3a, and the long hole 3c is configured similarly to the long hole 3c of the front slope part 3. A plurality of supports similar to those of the front slope part 3 are provided inside the rear slope part 3.

The vehicle V moves from the floor surface onto the mounting part 4 via the rear slope part 3 when the inspection is started, and moves from the mounting part 4 to the floor surface via the front slope part 3 after the inspection is completed.

In addition, the mounting part 4 includes front and rear mounting plates 5 and 6, the top plate 7, a base plate 8, etc. in order from top to bottom. In the present embodiment, the front and rear mounting plates 5 and 6 correspond to a mounting plate, and the base plate 8 corresponds to a bottom plate. The base plate 8 has a flat plate shape that extends in the front-rear direction in a rectangular shape in the plan view. The front and rear ends of the base plate 8 are integrally fixed to the front and rear slope parts 3. The base plate 8 is mounted on the floor surface and is firmly fixed to a floor F (see FIG. 8) via a fixture (not shown; for example, an anchor bolt). In the present embodiment, the floor F corresponds to a second fixing part.

The top plate 7 has a rectangular shape in the plan view and extends in the front-rear direction, and the top plate 7 is arranged in parallel to the base plate 8. The top plate 7 is provided with the opening 7a. The opening 7a is arranged at the center of the top plate 7 and is formed in a rectangular shape that is horizontally long in the plan view, and the opening 7a penetrates the top plate 7 in a vertical direction.

The front mounting plate 5 has a rectangular shape that is horizontally long in the plan view and extends in the front-rear direction, and four ribs 5a are provided on a surface of the front mounting plate 5. The four ribs 5a extend in the front-rear direction, and the two ribs 5a on the inner side define a traveling path and have a function of guiding the wheels W of the vehicle V. Thus, at the time of inspection, the wheels W are guided by the front mounting plate 5 as the vehicle V rides on the mounting table 2 and moves to an inspection position (see FIG. 11).

A front end of the front mounting plate 5 is mounted on the flat part 3a of the front slope part 3, and a pair of long holes 5b are formed between the two ribs 5a at the left and right ends. The long holes 5b extend in the front-rear direction in parallel to each other. The front end of the front mounting plate 5 is fixed to the front slope part 3 via a hydraulic clamp device 9 at the edges of the long holes 5b.

Figure 4:
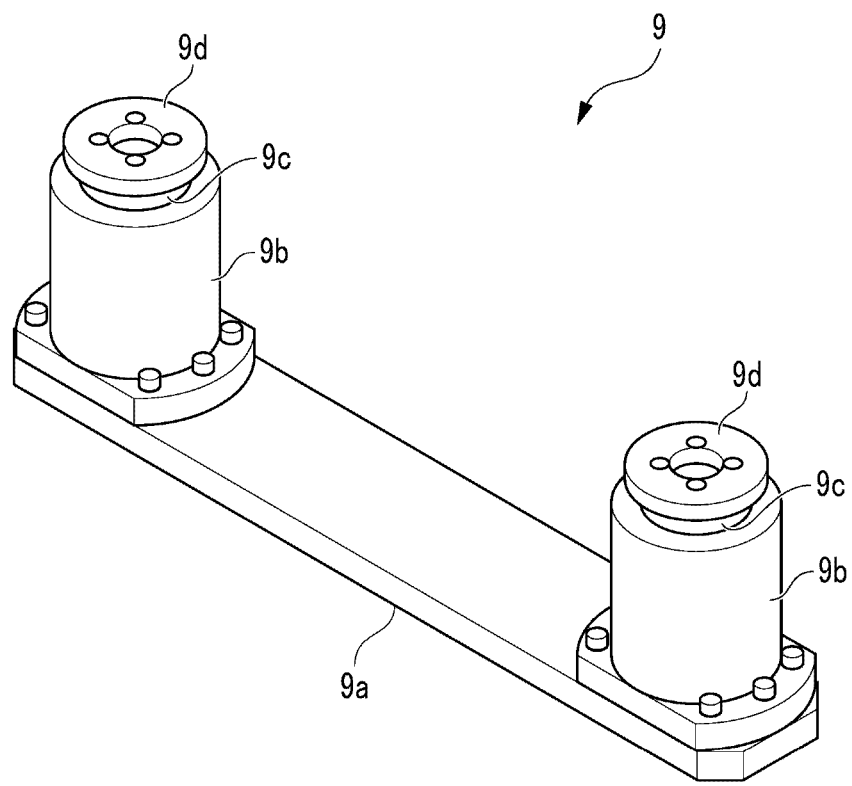
FIG. 4 is a perspective view showing a configuration of a hydraulic clamp device.

As shown in FIG. 4, the hydraulic clamp device 9 includes a connecting plate 9a and two hydraulic cylinders 9b, and the hydraulic cylinders 9b are screwed to the upper surface of the connecting plate 9a.

Each hydraulic cylinder 9b is provided with a piston rod 9c, and a flange 9d is integrally provided at the upper end of the piston rod 9c. In the hydraulic clamp device 9, the hydraulic pressure supplied from a hydraulic circuit (not shown; will be described later) to the hydraulic cylinder 9b is controlled by a control device (not shown), by which the piston rod 9c expands/contracts from the hydraulic cylinder 9b in the vertical direction.

In the case of the hydraulic clamp device 9, the front mounting plate 5 and the flat part 3a of the front slope part 3 are held between the lower surface of the flange 9d and the upper end surface of the hydraulic cylinder 9b in a state where each piston rod 9c is fitted into the long hole 5b of the front mounting plate 5 and the above-described long hole 3c of the front slope part 3. Thus, the front mounting plate 5 is fixed to the front slope part 3.

Further, in this state, the piston rod 9c extends relatively upward from the hydraulic cylinder 9b to release the fixing of the front mounting plate 5 to the front slope part 3. In such a state where the fixing of the front mounting plate 5 to the front slope part 3 is released, the piston rod 9c can move in the left-right direction while being guided by the long hole 3c of the front slope part 3 so the front mounting plate 5 can move in the left-right direction by the length of the long hole 3c. Specifically, the front mounting plate 5 is configured to be movable in the left-right direction between a maximum width position shown in FIG. 2 and a minimum width position shown in FIG. 3.

In addition, the rear end of the front mounting plate 5 is mounted on the upper surface of the front end of the rear mounting plate 6, and a pair of long holes 5e are formed at the left and right ends. Each of the long holes 5e has the same length in the front-rear direction as each of the long holes 5b, and the center line extending in the front-rear direction is arranged on the same straight line as the center line of each long hole 5b.

A piston rod (not shown) of a hydraulic clamp device 9A is fitted into each long hole 5e, and the piston rod is also fitted into a long hole 6e of the rear mounting plate 6 (will be described later). The hydraulic clamp device 9A is configured similarly to the above-described hydraulic clamp device 9 except that the hydraulic clamp device 9A is slightly smaller in size, and therefore a description thereof will be omitted.

With the above configuration, in a state where the fixing of the hydraulic clamp devices 9 and 9A is released, an edge of the long hole 5b of the front mounting plate 5 can move along the piston rod 9c of the hydraulic clamp device 9, and an edge of the long hole 5e of the front mounting plate 5 can move along the piston rod of the hydraulic clamp device 9A.

Thus, the front mounting plate 5 can move in the front-rear direction relative to the front slope part 3 by the lengths of the long holes 5b and 5e in the front-rear direction. Specifically, the front mounting plate 5 is configured to be movable in the front-rear direction between a maximum length position shown in FIG. 2 and a minimum length position shown in FIG. 3.

Figure 5:
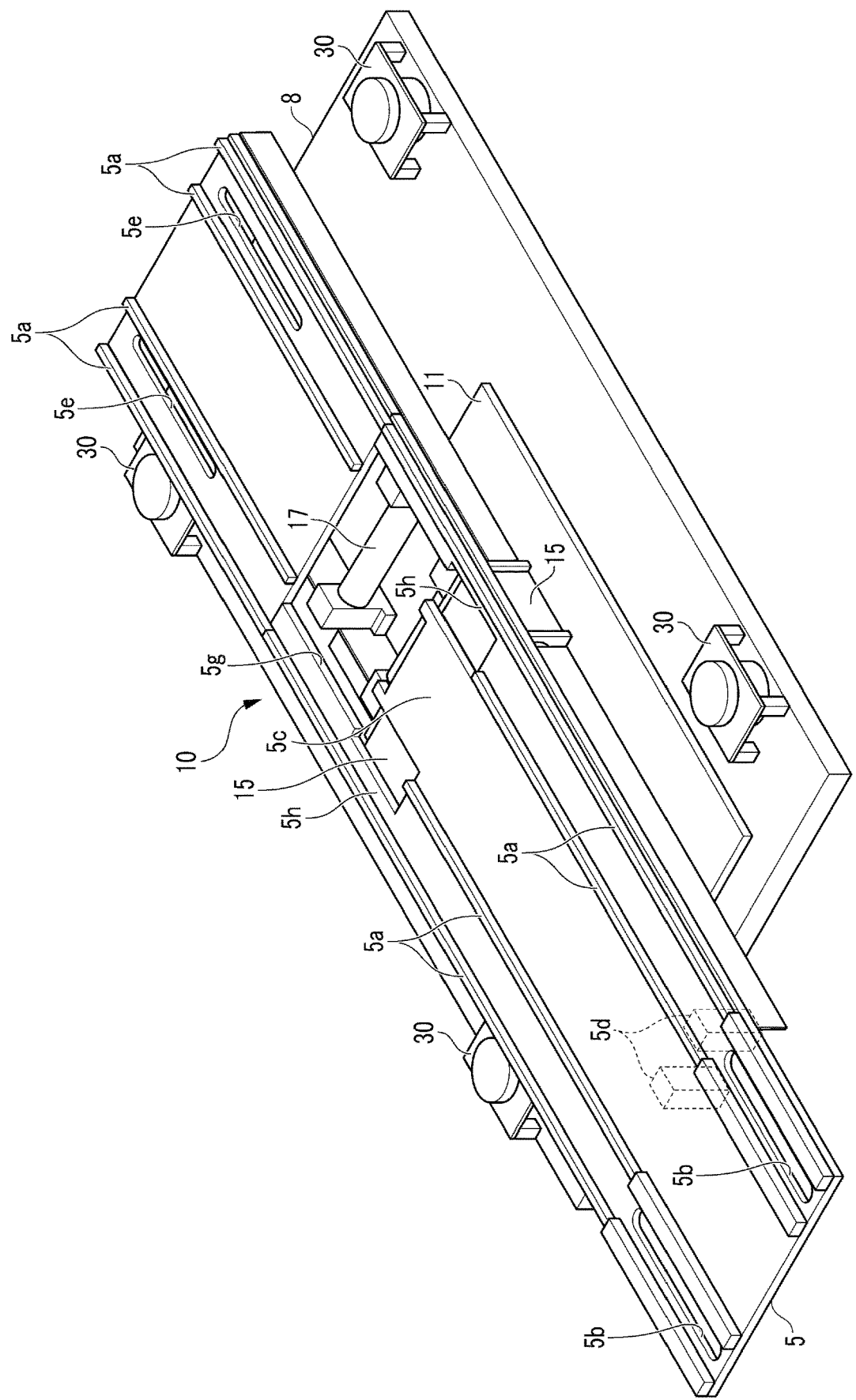
FIG. 5 is a perspective view showing a configuration of a front mounting plate and an exciter.
Figure 6:
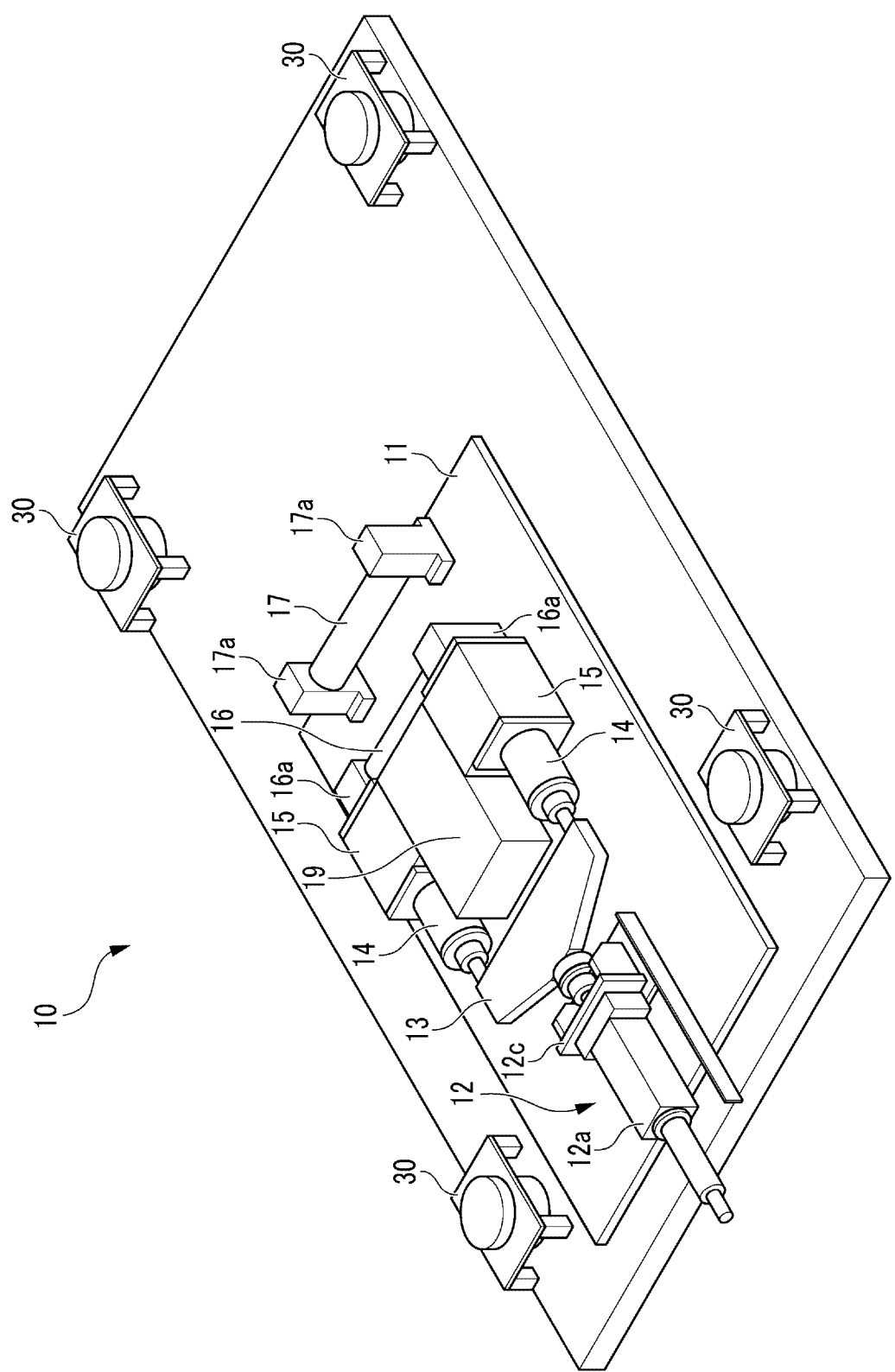
FIG. 6 is a perspective view showing a configuration of the exciter.
Figure 7:
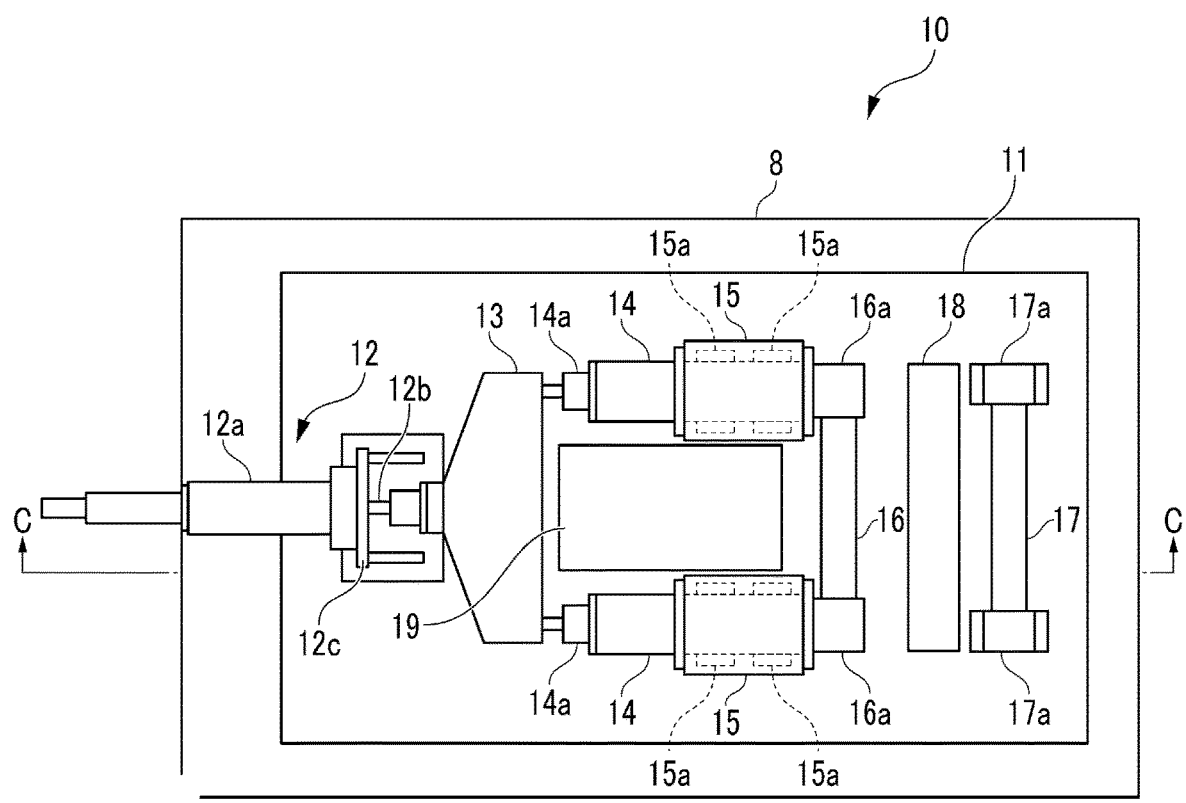
FIG. 7 is a plan view showing a state where a second roller of the exciter is at an excitation position.

Furthermore, a pair of supports 5d are provided on the back surface of the front end of the front mounting plate 5 (see FIG. 5). The supports 5d extend downward from a portion slightly behind the rear end of the long hole 5b in a state of being spaced from each other in the left-right direction.

When the front mounting plate 5 is fixed to the front slope part 3, the lower end of each support 5d is in contact with the upper surface of the base plate 8. Thus, a force acting on the front mounting plate 5 from above is supported by the supports 5d.

The rear end of the front mounting plate 5 is fixed to the rear mounting plate 6 while being pressed against the front end of the rear mounting plate 6 by the hydraulic clamp device 9A.

An opening 5g is provided behind the center of the front mounting plate 5. The opening 5g is formed in a rectangular shape in the plan view and penetrates the front mounting plate 5 in the vertical direction. The exciter 10 is arranged below the opening 5g, and details of the exciter 10 will be described later.

The opening 5g is provided for the lower side of the wheel W of the vehicle V to be held by a first roller 17 and a second roller 16 of the exciter 10 via the opening 5g when the vehicle V is inspected, as will be described later.

Therefore, a width of the opening 5g in the left-right direction is set to be much larger than a width of an installation surface of the wheel W, and a length of the opening 5g in the front-rear direction is set to be much larger than a length of the installation surface of the wheel W in the front-rear direction. Thus, when the lower side of the wheel W is excited in a state of being held by the first roller 17 and the second roller 16, the wheel W does not interfere with an edge of the opening 5g.

Next, the rear mounting plate 6 will be described. The rear mounting plate 6 has a rectangular shape that is horizontally long in the plan view and extends in the front-rear direction, and four ribs 6a are provided on a surface of the rear mounting plate 6. Each of the four ribs 6a has the same function as each of the four ribs 5a described above, and the center line extending in the front-rear direction is arranged on the same straight line as the center line of each of the four ribs 5a described above.

Similar to the ribs 5a, the ribs 6a also define a traveling path and have a function of guiding the wheels W of the vehicle V. Thus, at the time of inspection, the wheels W are guided by the rear mounting plate 6 as the vehicle V rides on the mounting table 2 and moves to the inspection position. In the mounting table 2, the upper ends of the ribs 5a and 6a are set at the same height and are the highest portions of the mounting table 2.

The upper surface of the rear end of the rear mounting plate 6 is arranged at the same height as the upper surface of the front end of the front mounting plate 5 described above, and the rear end of the rear mounting plate 6 is configured to be plane-symmetric with the front end of the front mounting plate 5. That is, the rear end of the rear mounting plate 6 is mounted on the flat part 3a of the rear slope part 3, and a pair of long holes 6b are formed between the two ribs 6a at the left and right ends.

The piston rod 9c of the hydraulic clamp device 9 is fitted into each long hole 6b, and the piston rod 9c is also fitted into the long hole 3c of the rear slope part 3.

The rear end of the front mounting plate 5 is mounted on the upper surface of the front end of the rear mounting plate 6, and a pair of long holes 6e are formed at the left and right ends. Each of the long holes 6e has the same length in the front-rear direction as each of the long holes 6b, and is arranged concentrically with each long hole 6b in the front-rear direction. As described above, the piston rod of the hydraulic clamp device 9A is fitted into each long hole 6e.

With the above configuration, in a state where the fixing of the hydraulic clamp devices 9 and 9A is released, an edge of the long hole 6b of the rear mounting plate 6 can move along the piston rod 9c of the hydraulic clamp device 9, and an edge of the long hole 6e of the rear mounting plate 6 can move along the piston rod of the hydraulic clamp device 9A.

Thus, the rear mounting plate 6 can move in the front-rear direction relative to the rear slope part 3 by the lengths of the long holes 6b and 6e in the front-rear direction. Specifically, the rear mounting plate 6 is configured to be movable in the front-rear direction between a maximum length position shown in FIG. 2 and a minimum length position shown in FIG. 3.

Further, in a state where the fixing of the hydraulic clamp device 9 is released, the rear mounting plate 6 can move in the left-right direction by the length of the long hole 3c while the piston rod 9c is guided by the long hole 3c of the rear slope part 3. Thus, the rear mounting plate 6 is configured to be movable in the left-right direction between a maximum width position shown in FIG. 2 and a minimum width position shown in FIG. 3 in a state of being integrated with the front mounting plate 5.

Furthermore, a pair of supports 6d are provided on the back surface of the rear end of the rear mounting plate 6. The supports 6d extend downward from a portion slightly behind the rear end of the long hole 6b in a state of being spaced from each other in the left-right direction.

When the rear mounting plate 6 is fixed to the rear slope part 3, the lower ends of the supports 6d are in contact with the upper surface of the base plate 8. Thus, a force acting on the rear mounting plate 6 from above is supported by the supports 6d.

In addition, three supports 6h are provided on the back surface of the front end of the rear mounting plate 6. The three supports 6h extend downward from a portion between the two long holes 6e of the rear mounting plate 6 in a state of being spaced from each other in the left-right direction.

When the rear end of the rear mounting plate 6 is fixed to the rear slope part 3 by the hydraulic clamp device 9, and the front end of the rear mounting plate 6 is fixed to the front mounting plate 5 via the hydraulic clamp device 9A, the lower end of each of the supports 6*h* is in contact with the upper surface of the base plate 8. Thus, a force acting on the rear mounting plate 6 from above is supported by the supports 6*h*.

Further, an opening 6*g* is provided at the center of the rear mounting plate 6. The opening 6*g* is formed in a rectangular shape in the plan view and penetrates the rear mounting plate 6 in the vertical direction, and is configured to have the same size as the above-described opening 5*g* of the front mounting plate 5. The exciter 10 is arranged below the opening 6*g*.

Next, the exciter 10 will be described with reference to FIG. 5 to FIG. 10. FIG. 5 shows a configuration in which the top plate 7 is omitted for easy understanding. In the excitation device 1 of the present embodiment, the exciter 10 arranged below the opening 5*g* of the front mounting plate 5 and the exciter 10 arranged below the opening 6*g* of the rear mounting plate 6 have the same configuration. Therefore, the exciter 10 arranged below the opening 5*g* of the front mounting plate 5 will be described as an example hereinafter.

The exciter 10 is provided on a movable base plate 11 that has a rectangular shape in the plan view, and the movable base plate 11 is fixed to the base plate 8 via a magnet clamp (not shown) in a state where the bottom surface of the movable base plate 11 is in surface contact with the upper surface of the base plate 8. In the present embodiment, the movable base plate 11 corresponds to the bottom plate.

In addition, four position changing devices 30 and a plurality of free bearings (not shown) are provided on the upper surface of the base plate 8. The four position changing devices 30 are arranged in a rectangular shape in the plan view, and the movable base plate 11 is provided so as to be surrounded by these position changing devices 30.

Each position changing device 30 includes a plurality of toothed pulleys, a toothed belt wound around the pulleys, a motor mechanism driving one toothed pulley, etc. (none is shown). Two ends of the toothed belt of each position changing device 30 are connected to four predetermined portions of the movable base plate 11. Further, a plurality of free bearings are arranged at positions below the movable base plate 11.

With the above configuration, in a state where the fixing of the magnet clamp is released, the movable base plate 11 moves on the base plate 8 while rolling a plurality of free bearings with the rotation of the pulleys in the four position changing devices 30. That is, the movable base plate 11 is configured so that the position of the movable base plate 11 relative to the base plate 8 is changeable. Then, the movable base plate 11 is fixed to the base plate 8 via the magnet clamp at the position thus changed.

Figure 8:
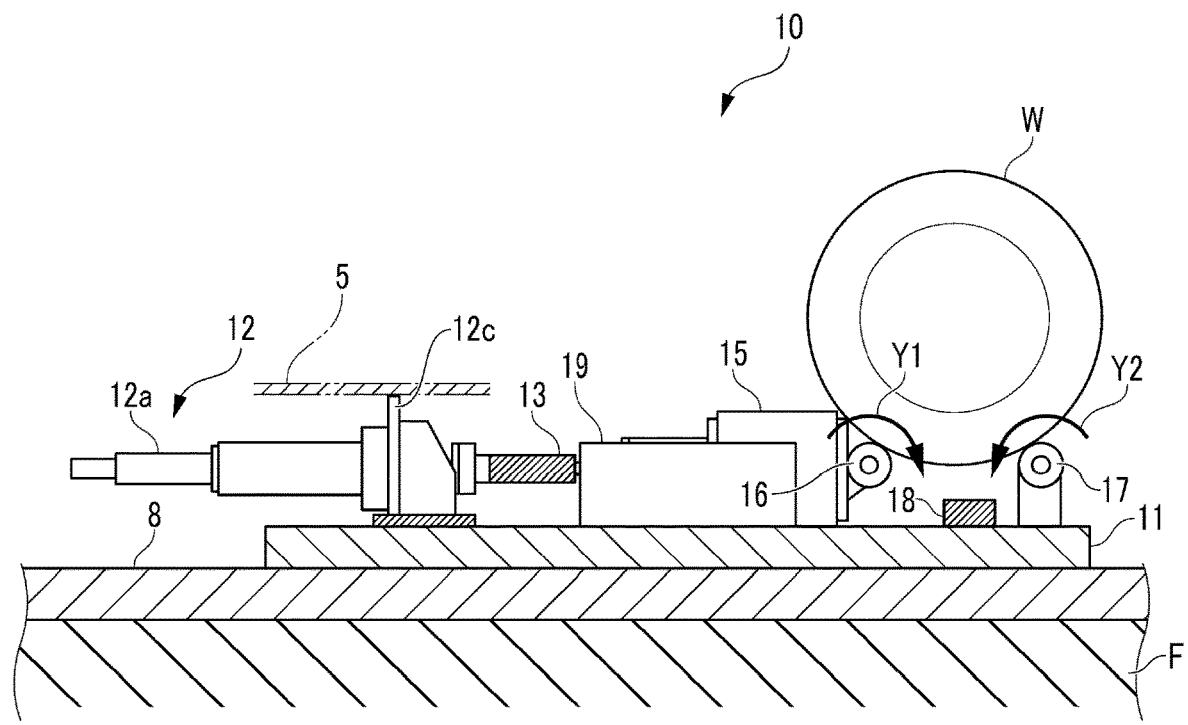
FIG. 8 is a side view showing a cross section taken along the line C-C of FIG. 7.
Figure 9:
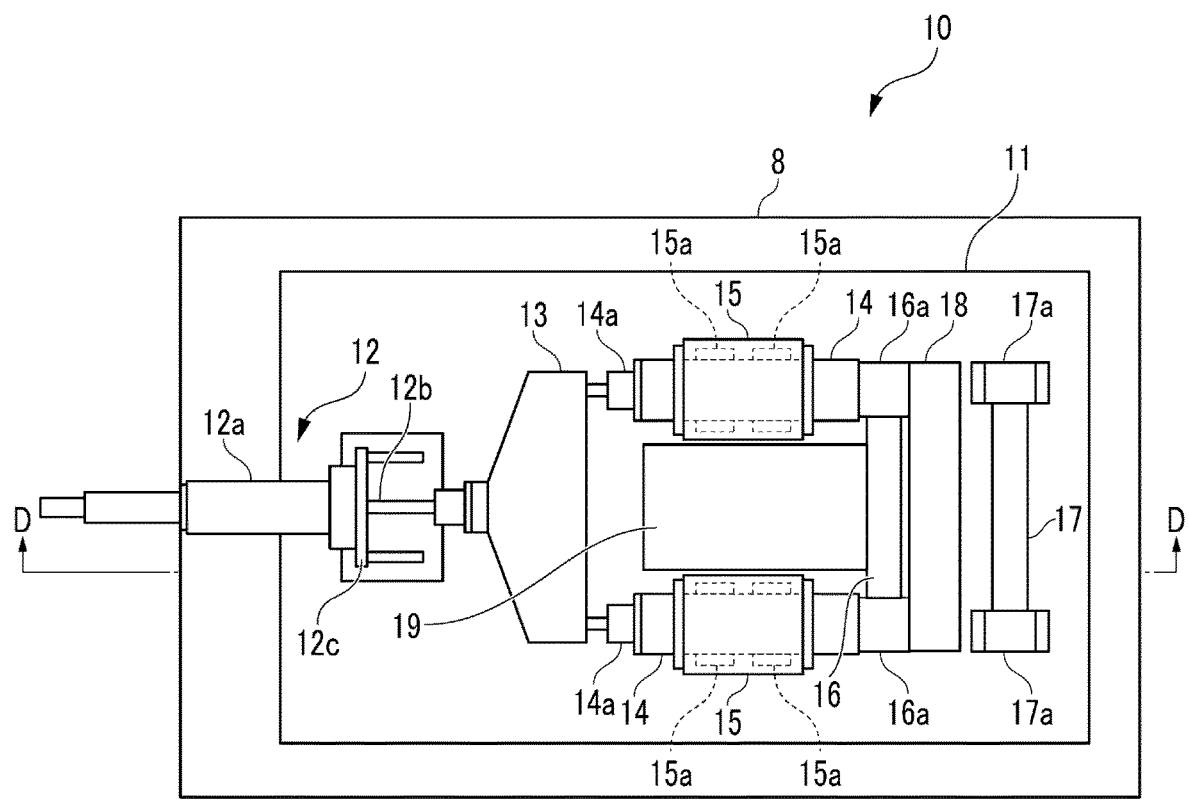
FIG. 9 is a plan view showing a state where the second roller of the exciter is at a push-out position.
Figure 10:
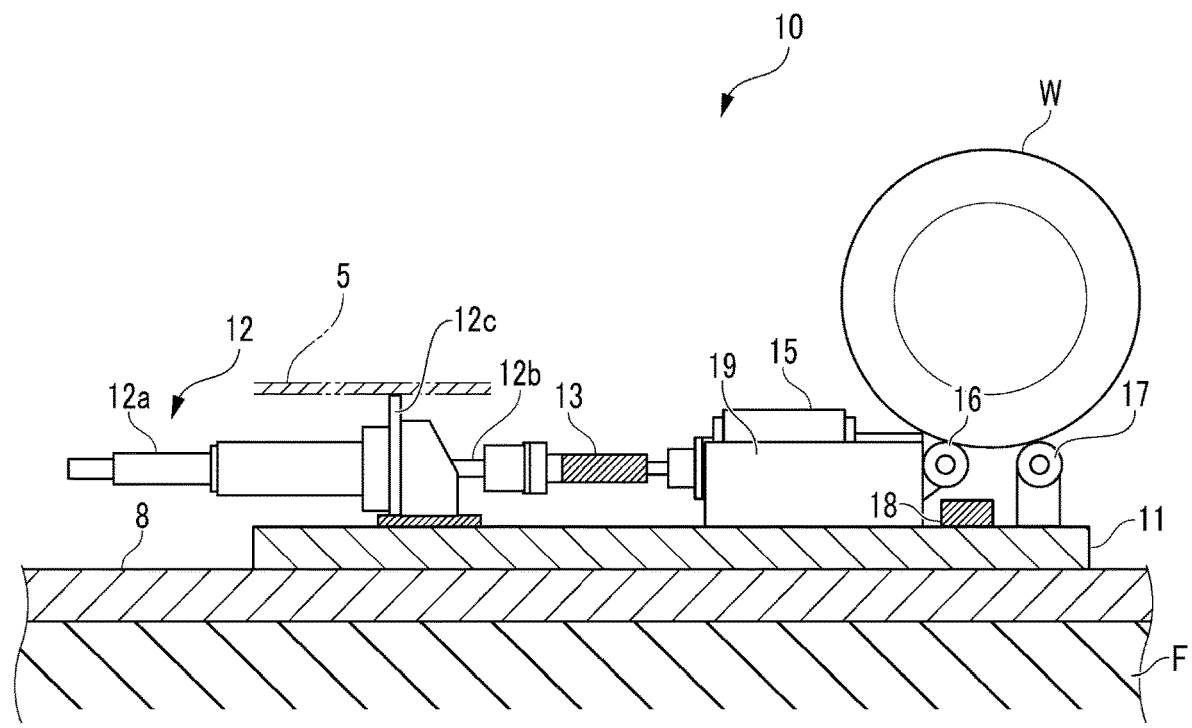
FIG. 10 is a side view showing a cross section taken along the line D-D of FIG. 9.

The exciter 10 includes a hydraulic actuator 12, an excitation arm 13, two excitation shafts 14, two bearing parts 15, the second roller 16, the first roller 17, a ground base 18, a passage base 19, etc. In FIG. 8 and FIG. 10, hatching of the cross sections of the second roller 16 and the first roller 17 is omitted for easy understanding.

The hydraulic actuator 12 includes a hydraulic cylinder 12*a*, a piston rod 12*b*, a bracket 12*c*, etc. The bracket 12*c* is provided for supporting the hydraulic cylinder 12*a*, and the lower end of the bracket 12*c* is bolted to the movable base plate 11. Further, the bracket 12*c* is bolted to the front mounting plate 5 in a state where the upper end of the bracket 12*c* is in contact with the lower surface of the front mounting plate 5. The hydraulic cylinder 12*a* is connected to the hydraulic circuit (not shown), and supplied with the hydraulic pressure from the hydraulic circuit.

In the present embodiment, the hydraulic actuator 12 corresponds to an actuator, the hydraulic cylinder 12*a* corresponds to an excitation part, and the bracket 12*c* corresponds to a supporting part.

The excitation arm 13 is connected to the tip of the piston rod 12*b* of the hydraulic actuator 12. In the hydraulic actuator 12, the hydraulic pressure supplied from the hydraulic circuit to the hydraulic cylinder 12*a* is controlled by the control device described above, by which the piston rod 12*b* is driven. Accordingly, the piston rod 12*b* is configured to drive the excitation arm 13 in the front-rear direction or to excite.

During an excitation operation performed by the hydraulic actuator 12, a bending load acts on the bracket 12*c* and causes a force to peel the bracket 12*c* from the movable base plate 11. As a result, the bracket 12*c* and a peripheral portion thereof may resonate. In contrast thereto, in the case of the exciter 10, as described above, the bracket 12*c* is firmly fixed to the front mounting plate 5 and the movable base plate 11, and the rigidity of the periphery of the bracket 12*c* is increased. Thereby, the resonance frequency is increased. Thus, the resonance of the bracket 12*c* and the peripheral portion thereof can be suppressed.

The left and right ends of the excitation arm 13 are respectively connected to the front ends of the excitation shafts 14 via ball joints 14*a*. The excitation shafts 14 are arranged at an interval in the left-right direction and extend at a predetermined length in the front-rear direction in parallel to each other. The excitation shafts 14 are rod-shaped members having a circular cross section and are slidably supported in the front-rear direction by the bearing parts 15. In the present embodiment, the excitation shaft 14 corresponds to an excitation member, and the bearing part 15 corresponds to the first fixing part.

In each bearing part 15, two hydrostatic bearings 15*a* are arranged side by side at a predetermined interval in the front-rear direction. The excitation shaft 14 is supported by the hydrostatic bearings 15*a* so that when the excitation shaft 14 vibrates in the front-rear direction, the vibration in a direction orthogonal to the front-rear direction (for example, left-right front-rear direction) is suppressed.

As shown in FIG. 5, an edge on the front side of the opening 5*g* of the front mounting plate 5 is an attachment part 5*c*. The attachment part 5*c* extends at a predetermined length in the front-rear direction, and the left and right ends of the attachment part 5*c* are respectively fixed to the upper surfaces of the bearing parts 15 via screws (not shown). Further, the edges 5*h* of the opening 5*g* located in the left-right direction of the attachment part 5*c* of the front mounting plate 5 are also respectively fixed to the upper surfaces of the bearing parts 15 via screws (not shown).

As described above, the upper surfaces of the bearing parts 15 are fixed to the front mounting plate 5 and the lower surfaces of the bearing parts 15 are fixed to the movable base plate 11 so the bearing parts 15 have a function of increasing the rigidity of the mounting table 2.

In addition, bearings 16*a* are respectively provided at the rear ends of the excitation shafts 14. The second roller 16 extends in the left-right direction at a position at a predetermined height from the upper surface of the movable base plate 11, and two ends of the second roller 16 are respectively supported by the bearings 16*a*. One-way clutches (not shown) are built in the bearings 16*a*, by which the second roller 16 is configured to be rotatable around the center axis line only in the clockwise direction (the direction of the arrow Y1) in FIG. 8.

With the above configuration, the second roller 16 is at least driven between an excitation position (for example, the position shown in FIG. 7 and FIG. 8) and a push-out position (for example, the position shown in FIG. 9 and FIG. 10) by the hydraulic actuator 12. Further, the vibration in the front-rear direction generated by the hydraulic actuator 12 is input to the second roller 16 via the excitation arm 13 and the excitation shafts 14.

Behind the second roller 16, the first roller 17 is provided to face and in parallel to the second roller 16. The left and right ends of the first roller 17 are supported by a pair of bearings 17a, and the bearings 17a are fixed onto the movable base plate 11. One-way clutches (not shown) are built in the bearings 17a, by which the first roller 17 is configured to be rotatable around the center axis line only in the counterclockwise direction (the direction of the arrow Y2) in FIG. 8. The first roller 17 is arranged so that the upper end of the first roller 17 is at a position slightly higher than the upper end of the second roller 16. Nevertheless, the first roller 17 may be arranged so that the upper end of the first roller 17 is at the same position as the upper end of the second roller 16.

When the vehicle V is inspected, since the lower side of the wheel W of the vehicle V is held by the first roller 17 and the second roller 16 described above, the size of the first roller 17 and the second roller 16 in the left-right direction is set to a value sufficiently larger than the width of the wheel W. In the present embodiment, the second roller 16 corresponds to a wheel supporting part and one of a pair of holding parts, and the first roller 17 corresponds to the wheel supporting part and the other of the pair of holding parts.

Further, the above-described ground base 18 is fixed between the first roller 17 and the second roller 16 on the movable base plate 11. The ground base 18 has a rectangular parallelepiped shape that is long in the left-right direction and is arranged in parallel to the first roller 17 and the second roller 16, and two ends of the ground base 18 extend to the same positions as the end surfaces of the pair of bearings 17a.

In the case of the ground base 18, the interval between the upper surface of the ground base 18 and the upper end surface of the rib 5a of the front mounting plate 5 is set to a value smaller than the minimum ground clearance of the vehicle V. This is to prevent the bottom surface of the body of the vehicle V from coming into contact with the upper end surface of the rib 5a of the mounting plate 5 if the interval between the first roller 17 and the second roller 16 is increased for some reason and causes the wheel W to move downward during excitation, etc.

In addition, the above-described passage base 19 is arranged between the bearing parts 15 on the movable base plate 11. The passage base 19 has a rectangular parallelepiped shape that is long in the front-rear direction, and a hydraulic actuator (not shown) is built in the passage base 19. The passage base 19 is driven in the front-rear position at least between a retracted position (for example, the position shown in FIG. 7 and FIG. 8) and a contact position (for example, the position shown in FIG. 9 and FIG. 10) where the passage base 19 contacts the second roller 16 at the push-out position by the hydraulic actuator.

When the passage base 19 moves to the contact position and comes into contact with the second roller 16 at the push-out position, the second roller 16 is held by the passage base 19 to be nonrotatable. This is to hold the second roller 16 in a rotation stopped state so as to transmit the driving force of the wheel W to the second roller 16 and facilitate moving the wheel W forward when the wheel W of the vehicle V moves forward while riding over the second roller 16 after the excitation operation is completed.

Furthermore, the upper surface of the passage base 19 functions as a passage for the wheel W when the wheel W moves forward as described above. Therefore, the height of the upper surface of the passage base 19 is set to the same height as the upper surface of the second roller 16.

The left half of the mounting table 2 is configured as described above, and the right half of the mounting table 2 is configured similarly.

Next, an operation in the excitation device 1 configured as described above when the vehicle V is inspected will be described. First, the hydraulic clamp devices 9 and 9A are loosened so that the two front mounting plates 5 and the two rear mounting plates 6 are set to be movable in the front-rear direction and the left-right direction. Besides, the magnet clamp is loosened so that the four movable base plates 11 are set to be movable relative to the base plate 8.

Then, in the above state, after the four movable base plates 11 are respectively moved to the positions corresponding to the wheelbase and tread of the vehicle V to be inspected by the four position changing devices 30, the four movable base plates 11 are fixed to the base plate 8 by the magnet clamp. With the movement of the movable base plates 11, the two front mounting plates 5 and the two rear mounting plates 6 move to the positions corresponding to the wheelbase and tread simultaneously with the movable base plates 11. Then, at these positions, at the same time as the front mounting plate 5 and the rear mounting plate 6 are fixed to each other via the hydraulic clamp device 9A, the front mounting plate 5 and the rear mounting plate 6 are fixed to the front and rear slope parts 3 via the hydraulic clamp devices 9.

Next, the hydraulic actuator 12 in each exciter 10 is driven, and the interval between the first roller 17 and the second roller 16 is set to a value corresponding to the size of the wheel W of the vehicle V to be inspected. Thereby, the preparation operation for the inspection is completed.

Figure 11:
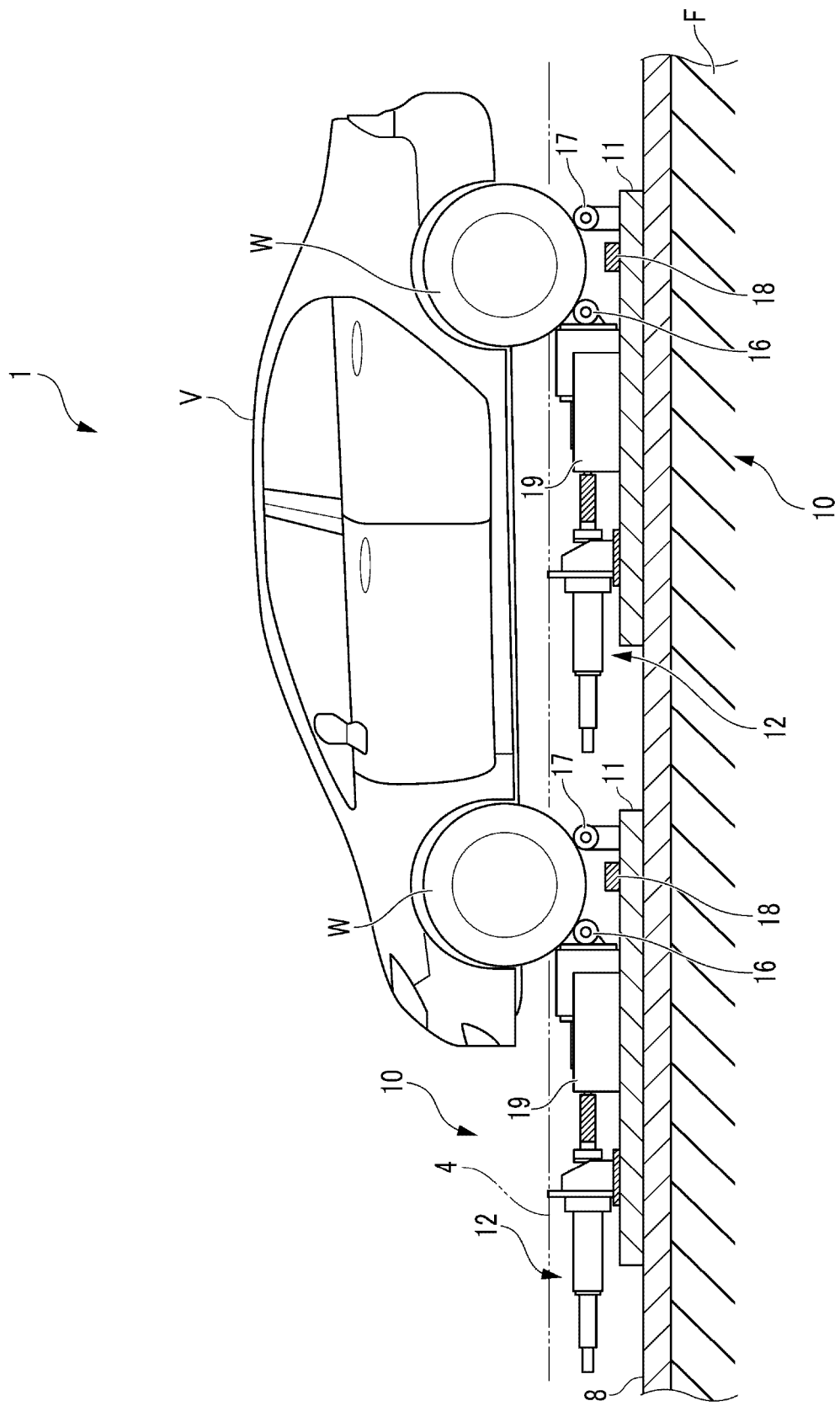
FIG. 11 is a view showing a state where a vehicle is mounted so as to be excited in the excitation device.

Next, the vehicle V is moved to ride on the mounting table 2 from the rear slope part 3, and as shown in FIG. 11, the four wheels W fit into the openings 5g of the front mounting plates 5 and the openings 6g of the rear mounting plates 6 and move downward, and enter a state of being held by the first rollers 17 and the second rollers 16 from the front-rear direction.

Figure 12:
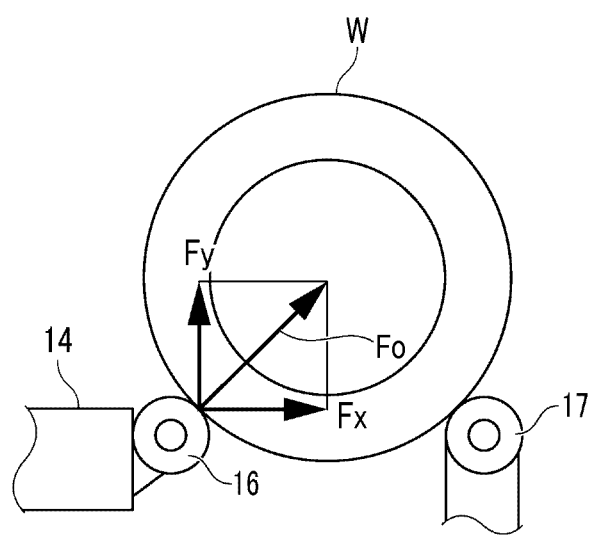
FIG. 12 is an explanatory view showing a pressing force acting on a wheel during excitation and force components thereof.

In this state, the hydraulic actuator 12 excites the second roller 16 in the front-rear direction so as to excite the wheel W. During the excitation, when a pressing force Fo of the second roller 16 acts on the wheel W, two force components Fx and Fy of the pressing force Fo act on the wheel W as shown in FIG. 12. That is, by exciting the second roller 16 in the front-rear direction, the wheel W is excited in the front-rear direction and the vertical direction simultaneously.

Figure 13:
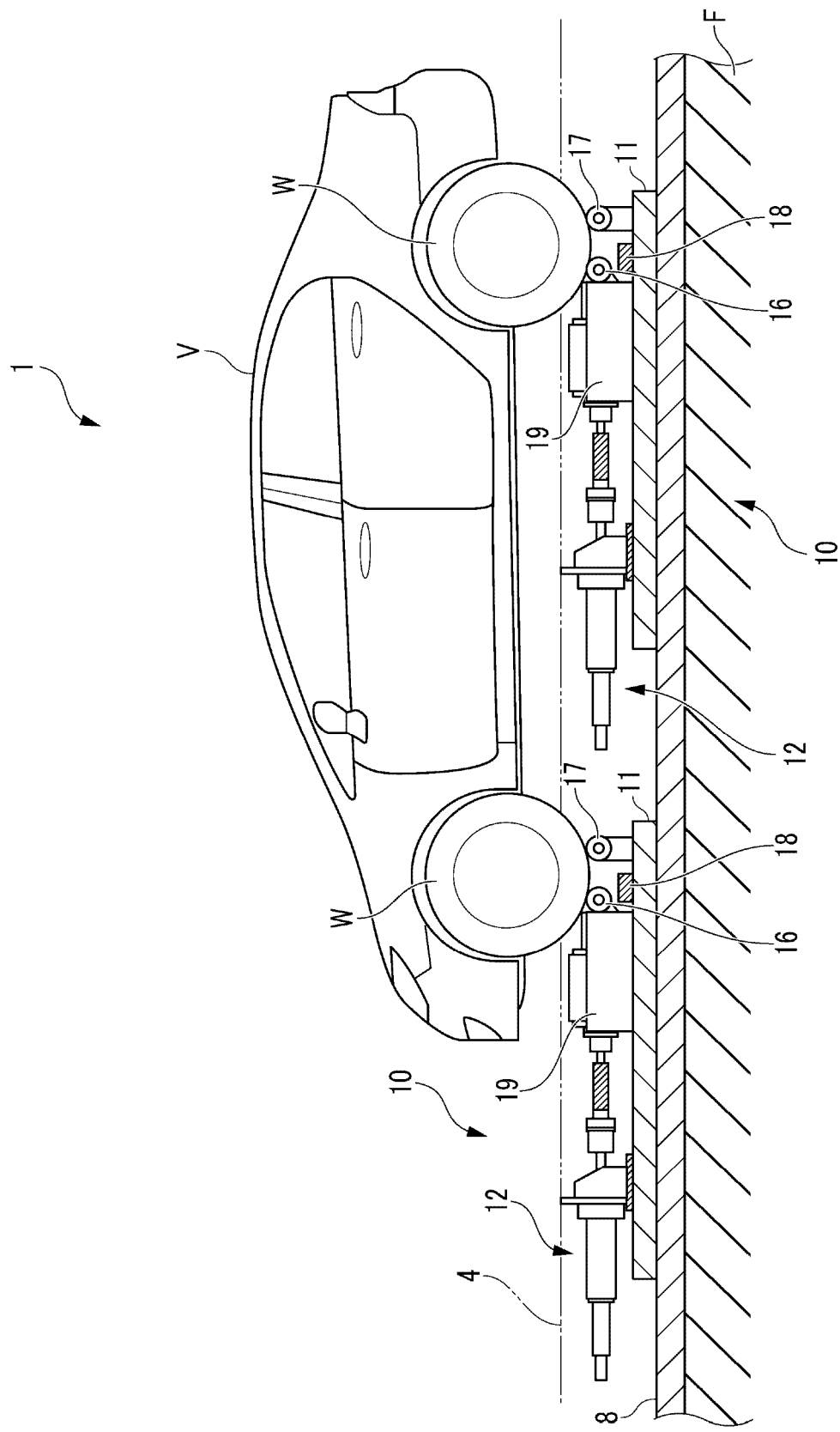
FIG. 13 is a view showing a state immediately before the vehicle gets out of the exciters.

When the excitation operation is performed as described above for a predetermined time and the inspection of the vehicle V is completed, the second roller 16 is moved from the inspection position shown in FIG. 11 to the push-out position shown in FIG. 13 by the hydraulic actuator 12. At the same time, the passage base 19 is moved from the retracted position shown in FIG. 7 and FIG. 8 to the contact position shown in FIG. 9 and FIG. 10 by the hydraulic actuator. Thus, the rear end of the passage base 19 comes into contact with the second roller 16 at the push-out position, so that the second roller 16 is held in the rotation stopped state.

In this state, the vehicle V starts moving forward, by which the wheel W can easily get out of the space between the two rollers 16 and 17 while riding over the second roller 16 in the rotation stopped state. Thus, the vehicle V can move forward and get off the mounting table 2 via the front slope parts 3.

As described above, according to the excitation device 1 of the present embodiment, when the vehicle V is inspected, the excitation shafts 14 are excited by the hydraulic actuator 12 in the front-rear direction of each wheel W in a state where the lower side of each wheel W is held by the first roller 17 and the second roller 16 from the front-rear direction of each wheel W. Consequently, since the second roller 16 is excited in the front-rear direction of each wheel W via the excitation shafts 14, the vibration is input to the contact point between the second roller 16 and the wheel W in an oblique direction. Thus, the vibrations of the force components act in the front-rear direction and the vertical direction of the wheel W, and therefore the wheel W can be excited in the front-rear direction and the vertical direction with one hydraulic actuator 12. As a result, the size in the vertical direction can be reduced as compared with the excitation device of Patent Document 1 which requires two actuators.

Further, during the excitation operation of the hydraulic actuator 12, a bending load acts on the bracket 12c and resonance occurs at the periphery of the bracket 12c, which may cause a force to peel the hydraulic cylinder 12a from the base plate 8 and the movable base plate 11. In contrast thereto, according to the excitation device 1 of the present embodiment, the upper end of the bracket 12c is fixed to the front and rear mounting plates 5 and 6, and the lower end is fixed to the base plate 8 via the movable base plate 11.

Furthermore, the front and rear mounting plates 5 and 6 and the base plate 8 are fixed to the front and rear slope parts 3, and the base plate 8 is fixed to the floor F. Thus, during the excitation operation of the hydraulic actuator 12, the bending load acting on the bracket 12c can be firmly supported by both the front and rear mounting plates 5 and 6 and the base plate 8, the rigidity of the periphery of the bracket 12c can be increased, and the resonance frequency can be increased. As a result, during the excitation performed by the exciter 10, the resonance at the periphery of the bracket 12c can be suppressed.

In addition, the bracket 12c and the bearing part 15 are fixed to the movable base plate 11 and the movable base plate 11 is detachably fixed onto the base plate 8 by the magnet clamp, and the front and rear mounting plates 5 and 6 are detachably fixed to the slope parts 3 by the hydraulic clamp devices 9.

Therefore, when the fixing of the movable base plate 11 to the base plate 8 via the magnet clamp is released, and the fixing of the front and rear mounting plates 5 and 6 to the slope parts 3 via the hydraulic clamp devices 9 is released, the movable base plate 11 can be moved within a predetermined range while the bracket 12c and the upper and lower ends of the bearing part 15 remain fixed to the mounting plates 5 and 6 and the movable base plate 11, respectively. Then, while the front and rear mounting plates 5 and 6 are fixed to the slope parts 3 by the hydraulic clamp devices 9 at any position within the predetermined range, the movable base plate 11 can be fixed to the base plate 8 by the magnet clamp. Thus, when the positions of the front and rear mounting plates 5 and 6 are changed, high rigidity of the periphery of the bracket 12c can be ensured even after the change, and resonance during excitation can be suppressed.

Figure 14:
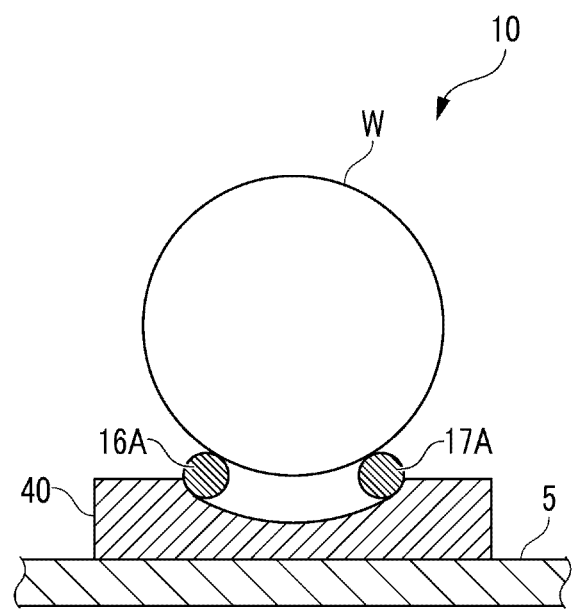
FIG. 14 is a view showing a modified example of the exciter.

The embodiment illustrates an example of using the first roller 17 and the second roller 16 as the wheel supporting part. However, the wheel supporting part of the disclosure is not limited thereto and may be any part that supports the lower side of each wheel and is excited by the excitation part of the actuator in the front-rear direction of each wheel W. For example, in the exciter 10, a wheel supporting part 40 shown in FIG. 14 may be used as the wheel supporting part in place of the first roller 17 and the second roller 16.

As shown in the figure, the wheel supporting part 40 is a plate-shaped member and is mounted on the front mounting plate 5, and is configured to be slidable relative to the front mounting plate 5 via a free bearing (not shown) or the like. The wheel supporting part 40 is connected to the tip of the excitation shaft 14 via a connection member (not shown) that extends upward from the excitation shaft 14 described above.

The center of the wheel supporting part 40 is a concave part that is recessed downward, and a pair of holding parts 16A and 17A having a circular cross section are provided at the front and rear ends of the concave part. The lower side portion of the wheel W is held by the pair of holding parts 16A and 17A from the front-rear direction. With the above configuration, according to the exciter 10, when the excitation shaft 14 is excited in the front-rear direction by the hydraulic actuator 12, the wheel W is excited in the front-rear direction via the wheel supporting part 40.

Further, the embodiment illustrates an example of using the front and rear mounting plates 5 and 6 as the mounting plate. However, the mounting plate of the disclosure is not limited thereto and may be any part that is fixed to the top plate and has an opening having a size larger than the size of the tread of each wheel in the front-rear direction and the left-right direction. For example, a single mounting plate extending in the front-rear direction may be used as the mounting plate.

Furthermore, the embodiment illustrates an example of using the base plate 8 and the movable base plate 11 as the bottom plate. However, the bottom plate of the disclosure is not limited thereto and may be any part arranged below the mounting plate to keep an interval between the bottom plate and the mounting plate in the vertical direction. For example, the base plate 8 alone may be used as the bottom plate.

The embodiment illustrates an example of using the first roller 17 and the second roller 16 as a pair of holding parts. However, the pair of holding parts of the disclosure are not limited thereto and may be any parts provided on the base plate and located below the opening of the mounting plate to be able to hold the lower side of each wheel from the front-rear direction of each wheel. For example, a pair of round bars, a pair of square bars, or a pair of inclined plates may be used as the pair of holding parts.

In addition, the embodiment illustrates an example of using the hydraulic actuator 12 as the actuator. However, the actuator of the disclosure is not limited thereto and may be any device that excites the excitation member in the front-rear direction of the wheel. For example, an electric actuator may be used as the actuator.

Further, the embodiment illustrates an example of connecting the hydraulic actuator 12 to the second roller 16 via the excitation arm 13, two excitation shafts 14, and two bearing parts 15. However, the two excitation shafts 14 and the two bearing parts 15 may be omitted, and the hydraulic actuator 12 may be connected to the second roller 16 via the excitation arm 13.

The embodiment illustrates an example of using the bracket 12c as the supporting part. However, the supporting part of the disclosure is not limited thereto and may be any part that has the lower end fixed to the bottom plate and the upper end fixed to the mounting plate and supports the excitation part of the actuator. For example, a bracket having a shape different from that of the bracket 12c may be used as the supporting part, or a structure having the same function as the bracket 12c may be used as the supporting part.

In addition, the embodiment illustrates an example of using the excitation shaft 14 as the excitation member. However, the excitation member of the disclosure is not limited thereto and may be any part that is excited in the front-rear direction of each wheel by the actuator. For example, a rod-shaped member having a rectangular cross section may be used as the excitation member.

Further, the embodiment illustrates an example of fixing the front and rear mounting plates 5 and 6 to the front and rear slope parts 3 using the hydraulic clamp devices 9. However, the configuration of the fixture for fixing the front and rear mounting plates 5 and 6 to the front and rear slope parts 3 is not limited thereto and may be in any form that can fix the front and rear mounting plates 5 and 6 to the front and rear slope parts 3. For example, the front and rear mounting plates 5 and 6 may be fixed to the front and rear slope parts 3 using bolts and nuts.

The embodiment illustrates an example of fixing the movable base plate 11 to the base plate 8 using the magnet clamp. However, the configuration of the fixture for fixing the movable base plate 11 to the base plate 8 is not limited thereto and may be in any form that can fix the movable base plate 11 to the base plate 8. For example, the movable base plate 11 may be fixed to the base plate 8 using bolts and nuts.

Furthermore, the embodiment illustrates an example in which the front mounting plate 5 is provided with the long holes 5b and 5e, the rear mounting plate 6 is provided with the long holes 6b and 6e, and the front and rear slope parts 3 are provided with the long holes 3c, and in the state where the fixing of the hydraulic clamp device 9 is released, the front and rear mounting plates 5 and 6 are movable relative to the front and rear slope parts 3. However, round holes having a normal circular cross section may be provided in place of the long holes 5b, 5e, 6b, 6e, and 7b, and the front and rear mounting plates 5 and 6 may be fixed to the front and rear slope parts 3 by screwing bolts into nuts through the round holes.

Further, the embodiment illustrates an example of using the slope part 3 as the first fixing part. However, the first fixing part of the disclosure is not limited thereto and may be any part that extends between the mounting plate and the bottom plate, and is fixed to the bottom plate and is fixed to the mounting plate in a state of supporting the mounting plate. For example, the front and rear slope parts 3 of the mounting table 2 may be omitted, and a member for fixing between the front and rear mounting plates 5 and 6 and the base plate 8 may be provided at the front and rear ends of the mounting part 4 as the first fixing part.

In addition, the embodiment illustrates an example of using the floor F as the second fixing part. However, the second fixing part of the disclosure is not limited thereto and may be any part that fixes the base plate while the base plate is mounted thereon. For example, a metal base or the like may be used as the second fixing part, or a pit may be formed on a concrete floor and the bottom of the pit may be used as the second fixing part.

What is claimed is:

1. An excitation device exciting each of a plurality of wheels of a vehicle to be excited, the excitation device comprising:
    a mounting plate on which the wheels are mounted;
    a bottom plate arranged below the mounting plate to keep an interval between the mounting plate and the bottom plate in a vertical direction;
    a first fixing part extending between the mounting plate and the bottom plate, and fixed to the bottom plate and fixed to the mounting plate in a state of supporting the mounting plate;
    a wheel supporting part supporting a lower side of each of the wheels;
    an actuator comprising an excitation part connected to the wheel supporting part and exciting the wheel supporting part in a front-rear direction of each of the wheels; and
    a supporting part having a lower end fixed to the bottom plate and an upper end fixed to the mounting plate, and supporting the excitation part of the actuator,
    wherein the mounting plate comprises an opening that has a size larger than a size of a tread of each of the wheels in the front-rear direction and a left-right direction,
    the wheel supporting part is provided on the bottom plate and is located below the opening of the mounting plate, and comprises a pair of holding parts holding the lower side of each of the wheels from the front-rear direction of the each of the wheels, and
    the actuator excites one of the pair of holding parts.

2. The excitation device according to claim 1, wherein the bottom plate comprises:
    a base plate which is fixed to an immovable second fixing part in a state of being mounted on the second fixing part, and to which the first fixing part is fixed; and
    a movable base plate detachably fixed onto the base plate,
    wherein the pair of holding parts and the lower end of the supporting part are fixed to the movable base plate, and the mounting plate is detachably fixed to the first fixing part.

3. The excitation device according to claim 1, further comprising:
    an excitation member having one end connected to the one of the pair of holding parts and the other end connected to the excitation part of the actuator, and excited in the front-rear direction of each of the wheels by the actuator; and
    a bearing part having a lower end fixed to the bottom plate and an upper end fixed to the mounting plate, and supporting the excitation member.

4. The excitation device according to claim 3, wherein the bottom plate comprises:
    a base plate which is fixed to an immovable second fixing part in a state of being mounted on the second fixing part, and to which the first fixing part is fixed; and
    a movable base plate detachably fixed onto the base plate,
    wherein the pair of holding parts, the lower end of the supporting part, and the bearing part are fixed to the movable base plate, and
    the mounting plate is detachably fixed to the first fixing part.

* * * * *